United States Patent

Stafford et al.

[11] Patent Number: 5,859,390
[45] Date of Patent: Jan. 12, 1999

[54] HOSPITAL BED SCALE MOUNTING APPARATUS

[75] Inventors: Daniel G. Stafford, Batesville, Ind.; William E. Armstrong, Cincinnati, Ohio

[73] Assignee: Hill-Rom, Inc., Batesville, Ind.

[21] Appl. No.: 735,734

[22] Filed: Oct. 23, 1996

[51] Int. Cl.$^6$ ............................ G01G 19/52; G01G 21/10
[52] U.S. Cl. .................... 177/144; 177/187; 177/DIG. 9
[58] Field of Search .............................. 177/144, DIG. 9, 177/185, 187

[56] References Cited

U.S. PATENT DOCUMENTS

| | | | |
|---|---|---|---|
| 2,990,899 | 7/1961 | De Bella | 177/144 |
| 3,217,818 | 11/1965 | Engelsher et al. | 177/144 |
| 3,338,323 | 8/1967 | Swersey | 177/208 |
| 3,360,062 | 12/1967 | Potter | 177/144 |
| 3,512,595 | 5/1970 | Laimins | 177/185 |
| 3,656,478 | 4/1972 | Swersey | 177/164 |
| 3,722,611 | 3/1973 | Tikkonen | 177/144 |
| 3,773,124 | 11/1973 | Bullivant | 177/210 EM |
| 3,795,284 | 3/1974 | Mracek et al. | 177/144 |
| 3,876,018 | 4/1975 | Mracek et al. | 177/144 |
| 3,961,675 | 6/1976 | Siegel | 177/126 |
| 3,998,790 | 12/1976 | Mracek et al. | 177/144 |
| 4,006,789 | 2/1977 | Stultz et al. | 177/126 |
| 4,015,677 | 4/1977 | Silva et al. | 177/165 |
| 4,023,633 | 5/1977 | Swersey et al. | 177/144 |
| 4,033,420 | 7/1977 | De Masters | 177/126 |
| 4,281,730 | 8/1981 | Swersey et al. | 177/144 |
| 4,363,368 | 12/1982 | Paddon et al. | 177/144 |
| 4,411,327 | 10/1983 | Lockery et al. | 177/211 |
| 4,438,823 | 3/1984 | Hussels et al. | 177/144 |
| 4,487,276 | 12/1984 | Swersey et al. | 177/126 |
| 4,492,281 | 1/1985 | Van Allen et al. | 177/213 |
| 4,539,560 | 9/1985 | Fleck et al. | 340/573 |
| 4,550,793 | 11/1985 | Giles | 177/145 |
| 4,551,882 | 11/1985 | Swersey et al. | 16/226 |
| 4,601,356 | 7/1986 | Muccillo, Jr. | 177/211 |
| 4,629,015 | 12/1986 | Fried et al. | 177/25.11 |
| 4,751,754 | 6/1988 | Bailey et al. | 177/144 |
| 4,793,428 | 12/1988 | Swersey | 177/144 |
| 4,899,840 | 2/1990 | Boubille | 177/187 |
| 4,934,468 | 6/1990 | Koerber, Sr. et al. | 177/144 |
| 4,953,244 | 9/1990 | Koerber, Sr. et al. | 177/144 |
| 4,961,470 | 10/1990 | Koerber, Sr. | 177/144 |
| 5,173,977 | 12/1992 | Carruth et al. | 177/144 |
| 5,269,388 | 12/1993 | Reichow et al. | 177/144 |
| 5,600,104 | 2/1997 | McCauley et al. | 177/187 |

*Primary Examiner*—Randy W. Gibson
*Attorney, Agent, or Firm*—Barnes & Thornburg

[57] ABSTRACT

A scale mounting apparatus is provided for coupling a fixed support frame to a movable weigh frame. The apparatus includes a load cell having a first end rigidly coupled to the support frame and a second, movable end, a mounting bracket coupled to the weigh frame, an elastomeric mounting block, and a fastener for coupling the mounting block and the mounting bracket to the second movable end of the load cell.

26 Claims, 2 Drawing Sheets

# HOSPITAL BED SCALE MOUNTING APPARATUS

BACKGROUND AND SUMMARY OF THE INVENTION

The present invention relates to a hospital bed having the capability of weighing a patient located on the bed. More particularly, the present invention relates to an improved scale mounting apparatus for a hospital bed or other piece of equipment.

In certain instances, such as in intensive care or critical care units of a hospital, it is necessary to monitor a patient's weight on a regular basis. Therefore, various scale devices have been designed to accomplish weighing of the patient. In certain scale devices, a patient must be transferred to a separate scale or to a sling scale device for weighing the patient. See, for example, U.S. Pat. No. 4,551,882. In other instances, thin weighing scales are adapted to be placed under the patient. See, for example, U.S. Pat. Nos. 3,217,818 and 3,463,368. Other scales require the entire bed to be located on the scale. See, for example, U.S. Pat. No. 4,281,730.

The present invention relates to an improved scale mounting system for mounting a scale apparatus directly onto the bed to obtain a weight of the patient without moving the patient or the bed. In other words, the scale of the present invention is integrated with the frame system of the bed. Other such integrated scale devices are known. See, for example, U.S. Pat. Nos. 4,953,244; 4,793,428; and 5,269,388. These known scales typically include load cells or linear variable differential transformers for measuring the weight of a patient on the bed.

U.S. Pat. No. 4,953,244 discloses a weigh frame coupled to a patient support surface. The weigh frame is mounted at its four corners by load cells to a bed support frame. The weight detected by the four load cells is summed and processed to provide a weight of the patient. The present invention provides an improved scale mounting apparatus for securing a weigh frame to a support frame with load cells to each corner of the weigh frame.

Typically, the load cells used to measure the weight of the patient are sensitive to side loading. Such side loading can create weight errors. The mounting apparatus of the present invention provides a more stable mounting system which improves the linearity of the output from the load cells.

The mounting apparatus of the present invention is easier to install, provides improved frame stability, increases accuracy and repeatability of the measurements from the load cells, and reduces costs of production and installation.

According to one aspect of the present invention, a scale mounting apparatus is provided for coupling a fixed support frame to a movable weigh frame. The apparatus includes a load cell having a first end rigidly coupled to the support frame and a second, movable end, a mounting bracket coupled to the weigh frame, an elastomeric mounting block, and a fastener for coupling the mounting block and the mounting bracket to the second movable end of the load cell.

In the illustrated embodiment, the mounting block has a cylindrical shape. The mounting block has a hardness of about 70 to about 80 durometer.

The illustrated embodiment also includes a washer located between the fastener and the mounting block. The washer includes an outer flange configured to extend over a lower portion of an outer surface of the mounting block. The illustrated mounting bracket is formed to include a recessed section for surrounding an upper portion of the outer surface of the mounting block.

Also in the illustrated embodiment, the fastener extends through a central aperture formed in each of the washer, the mounting block, the mounting bracket and into the second end of the load cell. The first end of the load cell is coupled to a bottom surface of the support frame, and the second, movable end of the load cell includes a mounting surface aligned generally parallel to the bottom surface of the support frame. The mounting surface includes a threaded aperture aligned with an opening formed in the bottom surface of the support frame. The threaded aperture is configured to receive a threaded end of the fastener to secure the mounting block and the mounting bracket to the load cell. A head of the fastener is located outside the support frame to facilitate installation of the scale mounting apparatus.

Additional objects, features, and advantages of the invention will become apparent to those skilled in the art upon consideration of the following detailed description of the preferred embodiment exemplifying the best mode of carrying out the invention as presently perceived.

DETAILED DESCRIPTION OF THE DRAWINGS

Figure 1:
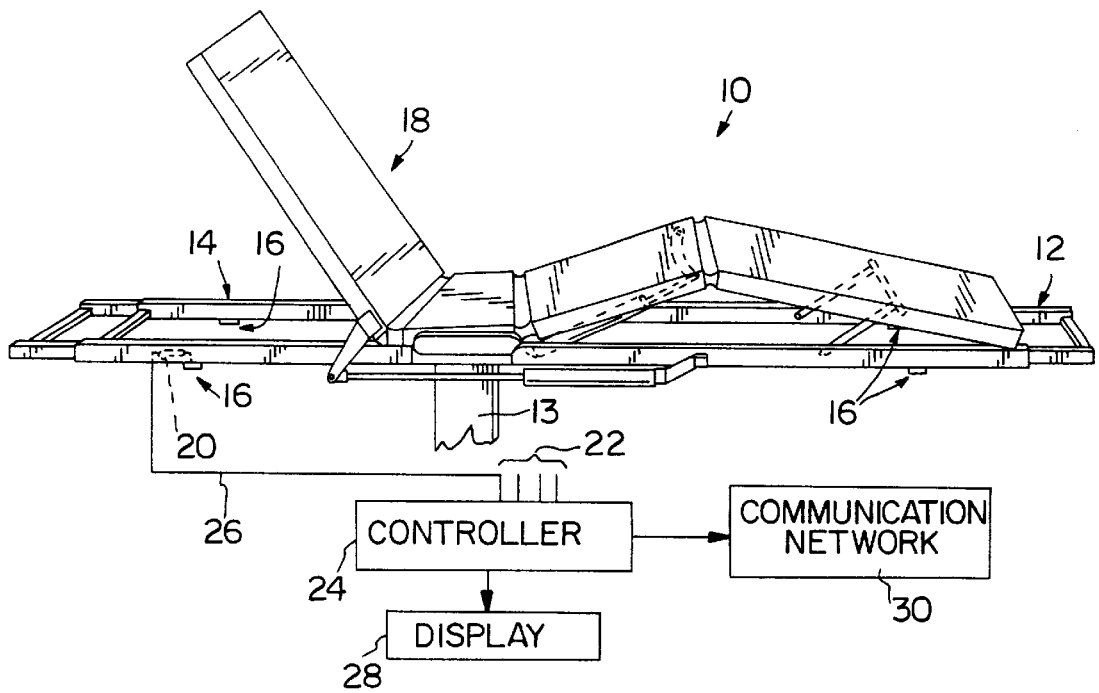
FIG. 1 is a perspective view of a rigid support frame of a bed, a weigh frame mounted on the support frame with an improved scale mounting apparatus of the present invention, and articulating deck mounted to the weigh frame for supporting a patient.

Referring now to the drawings, FIG. 1 illustrates portions of a bed 10 such as a hospital bed. Bed 10 includes a stationary support frame 12 rigidly coupled to a base 13 of the bed 10. The base 13 is not shown in detail. It is understood that any type of conventional bed base 13 may be used in connection with the present invention.

The bed 10 further includes a weigh frame 14 which is coupled to the support frame 12. Each corner of the weigh frame 14 is mounted to the support frame 12 by a separate scale mounting apparatus 16 in accordance with the present invention. Scale mounting apparatus 16 is described in detail below with reference to FIGS. 2–4.

An articulating deck 18 is mounted to the weigh frame 14 in a conventional manner. The articulating deck 18 provides a support surface for a patient on the bed 10. It is understood that any type of deck and support surface may be used to support the patient within the scope of the present invention.

Each mounting apparatus 16 is coupled to a load cell 20 within support frame 12 as discussed below. Load cells 20 each provide an output signal indicating the weight applied to each load cell 20. Each load cell 20 is coupled to an input 22 of a controller 24 by a supply line 26. For clarity, only one such supply line 26 is illustrated in FIG. 1. The output signals from load cells 20 are processed in a conventional manner to provide an indication of the weight of the patient.

See, for example, U.S. Pat. No. 4,953,244. The controller 24 is coupled to a display 28 to provide an indication of the weight of the patient. Controller 24 may also be coupled to a communication network 30 to transmit data to another room or nurse station of the building or to a remote location.

Figure 2:
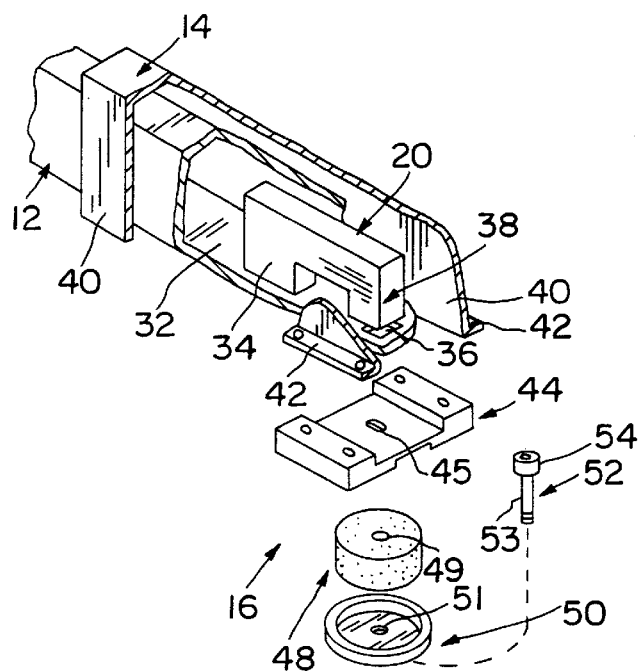
FIG. 2 is an exploded perspective view, with portions broken away, illustrating the scale mounting apparatus of the present invention in more detail.
Figure 3:
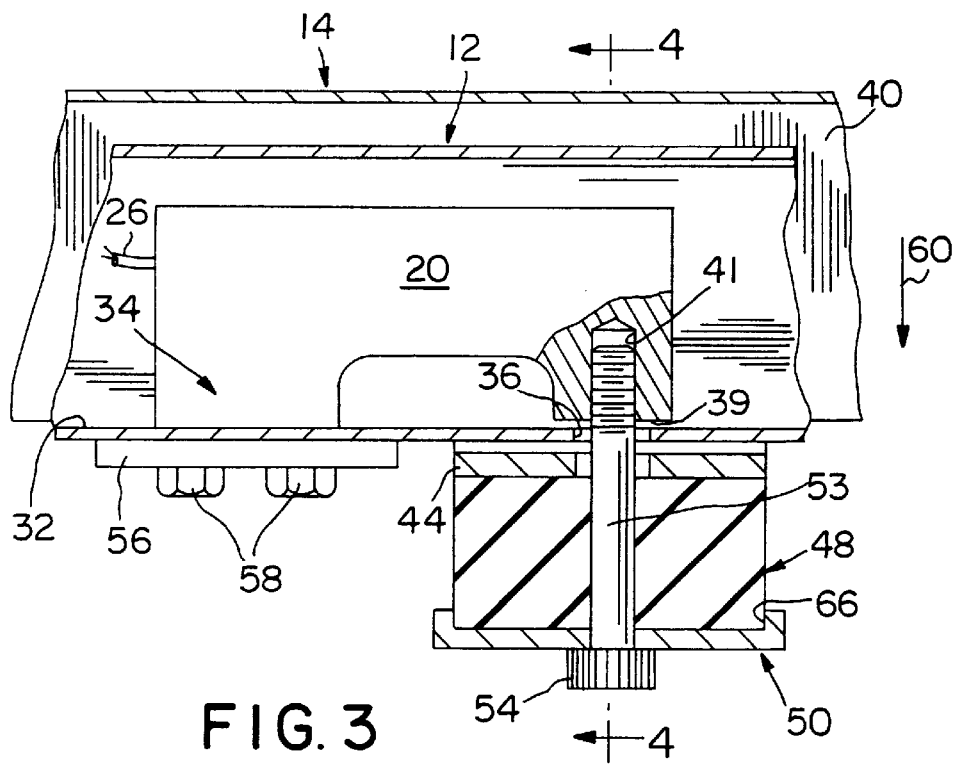
FIG. 3 is a sectional view further illustrating details of a load cell having a first end coupled to the support frame and a second end coupled to the weigh frame by the scale mounting apparatus of the present invention.
Figure 4:
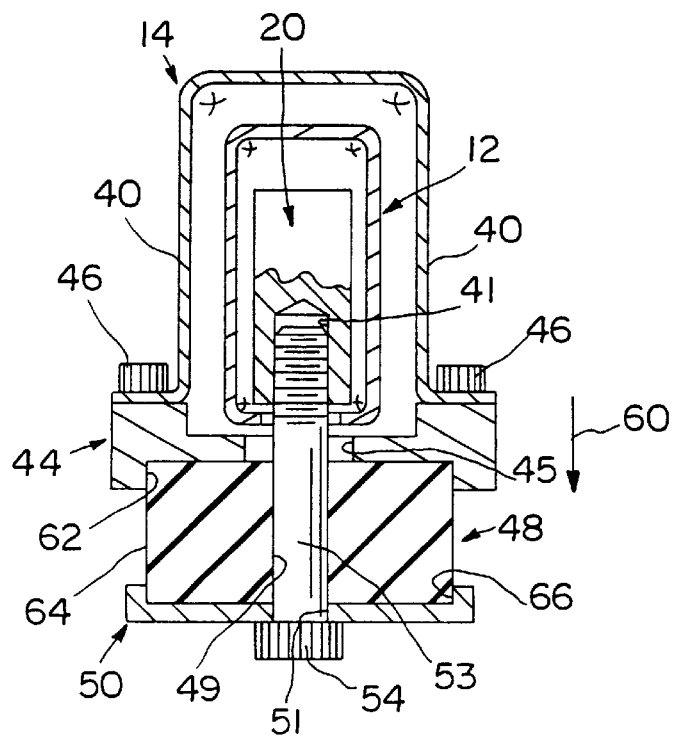
FIG. 4 is a sectional view taken along lines 4—4 of FIG. 3 illustrating further details of the scale mounting apparatus.

Details of the improved scale mounting apparatus 16 of the present invention are illustrated in FIGS. 2–4. Support frame 12 is formed to include a bottom surface 32 which is rigidly coupled to a first, fixed end 34 of load cell 20. Surface 32 of support frame 12 is formed to include an opening 36 adjacent the second movable end 38 of load cell 20. Weigh frame 14 is illustratively a U-shaped channel having opposite, parallel side walls 40. The U-shaped weigh frame 14 is configured to nest over the support frame 12 as best illustrated in FIG. 4.

Mounting flanges 42 are formed integrally with weigh frame 14. A mounting bracket 44 is configured to be coupled to mounting flanges 42 of weigh frame 18 by suitable fasteners 46 illustrated in FIG. 4. An elastomeric mounting block 48 and a cup washer 50 are secured to the second, movable end 38 of load cell 20 by a suitable fastener 52.

Movable portion 38 of load cell 20 includes a bottom surface 39 formed to include a threaded aperture 41 for receiving the fastener 52. Surface 39 is generally parallel to the bottom surface 32 of support frame 12. Illustratively, fastener 52 is a self locking shoulder screw which threads into a threaded aperture 41 formed in the movable end 38 of load cell 20 as best illustrated in FIGS. 3 and 4. Threaded aperture 41 is aligned with the opening 36 formed in the bottom surface 32 of support frame 12 so that the threaded aperture is accessible from outside the support frame 12.

A shaft 53 of fastener 52 extends upwardly through the cup washer 50, the mounting block 48, the mounting bracket 44, through opening 36 of support frame 12, and into the threaded second end 38 of load cell 20. A head 54 of fastener 52 engages the cup washer 50. Mounting bracket 44, mounting block 48, and cup washer 50 each include a central aperture 45, 49, and 51, respectively, for receiving the shaft 53 of fastener 52.

Referring to FIG. 3, the first, fixed end 34 of load cell 20 is secured to bottom surface 32 of support frame 12 by a mounting plate 56 and suitable fasteners 58 which extend upwardly into threaded apertures formed in the fixed end 34 of load cell 20. Therefore, the fixed end 34 of load cell 20 is rigidly secured to the bottom surface 32 of support frame 12. The weigh frame 18 is movable downwardly in the direction of arrow 60 when a patient is located on deck 18.

Illustratively, the mounting block 48 is a cylindrically shaped mounting block. Mounting block 48 is made from a elastomeric material such as urethane. Illustratively, mounting block 48 has a hardness of about 70 to about 80 durometer.

Mounting bracket 44 is formed to include a recessed section defined by a wall 62 for surrounding an outer surface 64 of mounting block 48. Bottom support washer 50 also includes a flange 66 configured to extend over a portion of the outer surface 64 of mounting block 48. Therefore, mounting bracket 44 and washer 50 cooperate with fastener 52 to hold the mounting block in position. This provides improved stability for the weigh frame 14 and deck 18. Illustratively, washer 50 is a zinc-plated steel washer. Also illustratively, mounting bracket 44 is made from a zinc diecast material.

The improved scale mounting apparatus 16 of the present invention improves side-to-side stability for the weigh frame 14 and deck 18 mounted on the support frame 12. This provides a more stable platform for supporting the patient and reduces side loading on the load cells 20. In other words, the elastomeric mounting block 48 damps or reduces movement of the weigh frame 14 relative to the support frame 12. The elastomeric mounting block 48 is resilient enough to permit slight arcuate movement of the movable end 38 of load cell 20 so that the load cell 20 can operate in a conventional manner. Illustratively, each load cell 20 is a model no. MED400-10100 available from HBM located in Marlboro, Mass.

In operation, a separate scale mounting apparatus 16 is coupled to each corner of the weigh frame 14 as illustrated in FIG. 1. The load cells 20 are provided with conventional strain gauges which are connected to controller inputs 22 by supply lines 26. When a patient rests on deck 18, weigh frame 14 is moved downwardly in the direction of arrows 60 in FIGS. 3 and 4. This applies a downwardly directed force in the direction of arrow 60 through the mounting bracket 44, through mounting block 48, through washer 50 and to the head 54 of fastener 52. Therefore, the movable end 38 of load cell 20 is also deflected downwardly in the direction of arrows 60. This causes an output signal from the load cell 20 to change and indicate the weight on deck 18.

Since the improved scale mounting apparatus 16 includes fastener 52 which threads directly into the movable end 38 of load cells 20 from a location outside of the support frame 12, the mounting apparatus 16 is easier to assemble and install than the mounting apparatus disclosed in U.S. Pat. No. 4,953,244. An operator can simply line up the threaded aperture 41 formed in the bottom surface 39 of the load cell 20 with the aperture 45 in mounting bracket and then install the fastener 52 with the mounting block 48 and washer 50 as discussed above. The elastomeric mounting block 48 eliminates the need for a separate stop coupled to the load cell 20.

Therefore, the scale mounting apparatus 16 is easier to install, provides improved frame stability, and increases accuracy and repeatability of the measurements from the load cells 20. Production and assembly costs are also reduced.

Although the invention has been described in detail with reference to a certain preferred embodiment, variations and modifications exist within the scope and spirit of the present invention as described and defined in the following claims.

What is claimed is:

1. A scale mounting apparatus for coupling a fixed support frame to a movable weigh frame, the apparatus comprising:
 a load cell having a first end rigidly coupled to the support frame and a second, movable end;
 a mounting bracket coupled to the weigh frame;
 an elastomeric mounting block; and
 a fastener firmly for coupling the mounting block and the mounting bracket to the second movable end of the load cell.

2. The apparatus of claim 1, wherein the mounting block has a cylindrical shape.

3. The apparatus of claim 1, wherein the mounting block has a hardness of about 70 to about 80 durometer.

4. The apparatus of claim 1, further comprising a washer located between one end of the fastener and the mounting block.

5. The apparatus of claim 4, wherein the washer includes an outer flange configured to extend over a portion of an outer surface of the mounting block.

6. The apparatus of claim 4, wherein the washer is made from steel.

7. The apparatus of claim 4, wherein the fastener extends through a central aperture formed in each of the washer, the mounting block, the mounting bracket and into the second end of the load cell.

8. The apparatus of claim 1, wherein the mounting bracket is formed to include a recessed section for surrounding a portion of an outer surface of the mounting block.

9. The apparatus of claim 1, wherein the first end of the load cell is coupled to a bottom surface of the support frame, and the second, movable end of the load cell includes a mounting surface aligned generally parallel to the bottom surface of the support frame, the mounting surface including a threaded aperture configured to receive a threaded end of the fastener to secure the mounting block and the mounting bracket to the load cell.

10. The apparatus of claim 9, wherein a head of the fastener is located outside the support frame to facilitate installation of the scale mounting apparatus.

11. A scale mounting apparatus for coupling a fixed support frame to a movable weigh frame, the apparatus comprising:

a load cell having a first end rigidly coupled to the support frame and a second, movable end;

an elastomeric mounting block having an outer surface;

a mounting bracket coupled to the weigh frame, the mounting bracket being formed to include a recessed section defined by a lip which surrounds an upper portion of the outer surface of the mounting block;

a fastener for coupling the mounting block and the mounting bracket to the second movable end of the load cell; and a washer located between one end of the fastener and the mounting block, the washer including an outer flange configured to extend over a lower portion of the outer surface of the mounting block.

12. The apparatus of claim 11, wherein the mounting block has a cylindrical shape.

13. The apparatus of claim 11, wherein the mounting block has a hardness of about 70 to about 80 durometer.

14. The apparatus of claim 11, wherein the washer is made from steel.

15. The apparatus of claim 11, wherein the fastener extends through a central aperture formed in each of the washer, the mounting block, the mounting bracket and into the second end of the load cell.

16. The apparatus of claim 11, wherein the first end of the load cell is coupled to a bottom surface of the support frame, and the second, movable end of the load cell includes a mounting surface aligned generally parallel to the bottom surface of the support frame, the mounting surface including a threaded aperture aligned with an opening formed in the bottom surface of the support frame, the threaded aperture being configured to receive a threaded end of the fastener to secure the mounting block and the mounting bracket to the load cell.

17. The apparatus of claim 16, wherein a head of the fastener is located outside the support frame to facilitate installation of the scale mounting apparatus.

18. A scale mounting apparatus for a hospital bed having a base, a support frame coupled to the base, and a patient support surface, the support frame being formed to include an opening formed a bottom surface, the apparatus comprising:

a U-shaped weigh frame located over the support frame, the patient support surface being coupled to the weigh frame, the weigh frame including downwardly extending first and second side walls located on opposite sides of the support frame;

a load cell having a first end rigidly coupled to the support frame and a movable second end;

a mounting bracket coupled to the first and second side walls of the weigh frame below the support frame;

an elastomeric mounting block; and a fastener configured to extend upwardly through the mounting block, the mounting bracket, and the aperture formed in the support frame, fastener being coupled to the second movable end of the load cell.

19. The apparatus of claim 18, wherein the mounting block has a cylindrical shape.

20. The apparatus of claim 18, wherein the mounting block has a hardness of about 70 to about 80 durometer.

21. The apparatus of claim 18, further comprising a washer located between the fastener and the mounting block.

22. The apparatus of claim 21, wherein the washer includes an outer flange configured to extend over a portion of an outer surface of the mounting block.

23. The apparatus of claim 21, wherein the fastener extends through a central aperture formed in each of the washer, the mounting block, the mounting bracket and into the second end of the load cell.

24. The apparatus of claim 18, wherein the mounting bracket is formed to include a recessed section for surrounding a portion of a outer surface of the mounting block.

25. The apparatus of claim 18, wherein the first end of the load cell is coupled to a bottom surface of the support frame, and the second, movable end of the load cell includes a mounting surface aligned generally parallel to the bottom surface of the support frame, the mounting surface including a threaded aperture configured to receive a threaded end of the fastener to secure the mounting block and the mounting bracket to the load cell.

26. The apparatus of claim 25, wherein a head of the fastener is located outside the support frame to facilitate installation of the scale mounting apparatus.

* * * * *